(12) United States Patent
Tanimoto

(10) Patent No.: US 6,966,995 B1
(45) Date of Patent: Nov. 22, 2005

(54) METHOD FOR TREATING AND ACTIVATING SEA WATER AND POLLUTED WATER INTO DRINKING WATER

(75) Inventor: Kayohiko Tanimoto, Chiba (JP)

(73) Assignee: Ichizo Kawano, Saitama (JP)

( * ) Notice: Subject to any disclaimer, the term of this patent is extended or adjusted under 35 U.S.C. 154(b) by 0 days.

(21) Appl. No.: 10/297,029

(22) PCT Filed: May 31, 2000

(86) PCT No.: PCT/JP00/03514

§ 371 (c)(1),
(2), (4) Date: Nov. 21, 2003

(87) PCT Pub. No.: WO01/92159

PCT Pub. Date: Dec. 6, 2001

(51) Int. Cl.$^7$ ............................. C02F 1/465; C02F 1/68
(52) U.S. Cl. ..................... 210/748; 210/806; 204/554
(58) Field of Search ................. 210/703, 748, 210/806, 807; 204/554, 571, 573, 293; 205/757

(56) References Cited

U.S. PATENT DOCUMENTS 4,501,661 A * 2/1985 Karasawa .................. 210/223
5,587,057 A * 12/1996 Metzler et al. .......... 204/228.6
5,728,303 A * 3/1998 Johnson ..................... 210/695
5,958,228 A * 9/1999 Tokushima et al. ......... 210/199

FOREIGN PATENT DOCUMENTS

| JP | 61-200890 A | * | 9/1986 |
| JP | 5-253572 A | * | 10/1993 |
| JP | 5-317870 A | * | 12/1993 |
| JP | 6-218381 A | * | 8/1994 |
| JP | 09-117779 A | * | 5/1997 |
| JP | 11-19641 A | * | 1/1999 |
| JP | 11-028470 A | * | 2/1999 |

* cited by examiner

*Primary Examiner*—Frank M. Lawrence
(74) *Attorney, Agent, or Firm*—Flynn, Thiel, Boutell & Tanis, P.C.

(57) ABSTRACT

A method of treating and activating sea water or polluted water into drinking water comprising the steps of separating and removing impurities from sea water or polluted water containing a great amount of deleterious materials such as chlorine, various kinds of heavy metals, environmental hormones, and miscellaneous bacteria by an electrode located in a primary treating tank, then introducing sea water or polluted water subjected to the primary treatment into a filtration tank for filtration and further introducing filtered water into a secondary treating tank, releasing useful minerals by magnetic ores and providing active power to various kinds of useful organic materials remained not filtered in the treated water.

4 Claims, 2 Drawing Sheets

METHOD FOR TREATING AND ACTIVATING SEA WATER AND POLLUTED WATER INTO DRINKING WATER

FIELD OF THE INVENTION

This invention concerns a method of cleaning sea water or polluted water such as sea water or tap water containing a great amount of deleterious materials disturbing materials and miscellaneous bacteria such as chlorine, various kinds of heavy metals and environmental hormones, or water discharged from plants containing a great amount of various organic materials and treating the cleaned water into active water optimal to drinking water.

BACKGROUND ART

As the method of treating sea water or polluted water conducted so far, as a pretreating stage the sea water or polluted water is placed in a sand-incorporated filtration tank, that is so-called sand filtration, certain impurities are filtered by the filtration tank and then the filtered sea water or polluted water is again filtered by a secondary filtration tank. In the secondary filtration tank, filtration media such as hollow threads or osmotic membranes are disposed to remove salts, oils and microorganisms by the secondary filtration tank. The water removing the salts, oils and microorganisms are cleaned by applying sodium chloride or the like to the water removing the salts, oils or microorganisms for sterilization.

However, in the existent filtration of sea water or polluted water, since useful organic materials necessary for water for cooking and drinking, water used for growing in various cultivation, water for public baths or pools, or water for treating various kinds of diseases are also filtered to form water which is quite useless for animal and plants.

This invention solves the foregoing drawbacks described above and intends to obtain highly useful water for animals and plants by cleaning sea water or polluted water, as well as positively leaving useful organic materials contained in the sea water or polluted water, activating the organic materials and positively providing minerals.

DISCLOSURE OF THE INVENTION

For attaining the foregoing object, this invention provides a method of treating and activating sea water or polluted water into drinking water which comprises:

(1) separating and removing impurities from sea water or polluted water containing a great amount of deleterious materials such as chlorine, various kind of heavy metals and environmental hormones, and miscellaneous bacteria by electrodes provided in a treating tank, (2) then introducing sea water or polluted water subjected to the primary treatment into a filtration tank to filter the sea water or polluted water by diatomaceous earth, activated carbon and various kinds of filtration media located in the filtration tank and, further, (3) introducing filtered water into a secondary treating tank, releasing useful minerals by magnetic ores located in the secondary treating vessel and providing activity to various kinds of not filtered useful organic materials in the treated water.

Further, this invention provides a method of treating and activating sea water or polluted water into drinking water by using titanium N-950 as the electrode.

Further, this invention provides a method of treating and activating sea water or polluted water into drinking water by using a mixture of poryphyritic granodiorite and/or black porphyry as the ore.

BEST MODE FOR CARRYING OUT THE INVENTION

A method of treating and activating sea water or polluted water into drinking water according to this invention is to be described by way of preferred embodiment thereof.

Figure 1:
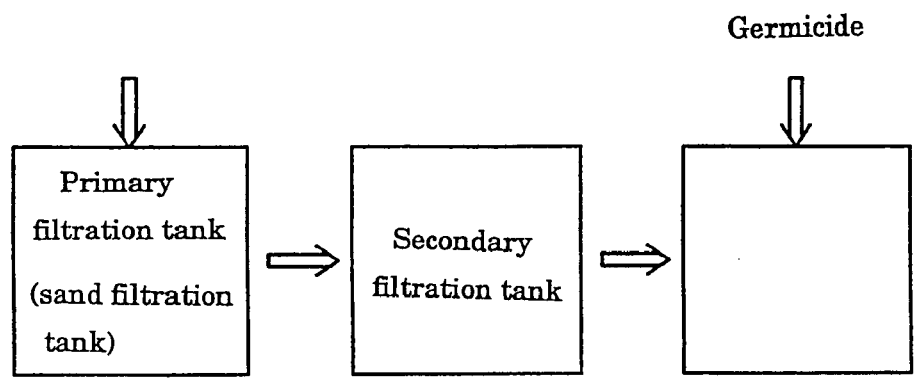
FIG. 1 is an explanatory view showing an existent method of treating sea water or polluted water.
Figure 2:
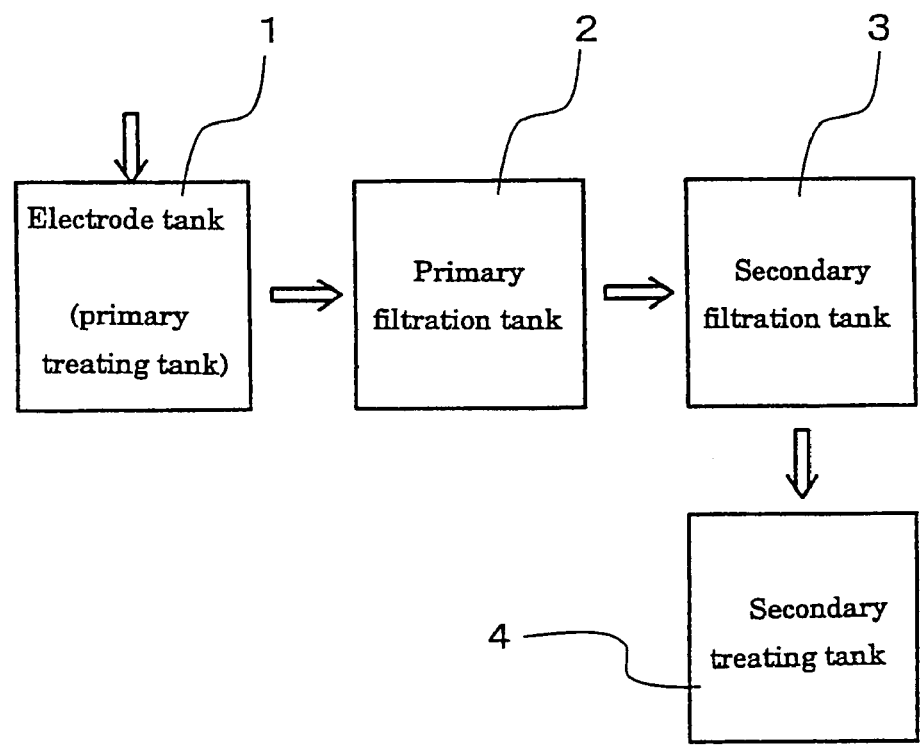
FIG. 2 is an explanatory view showing a method of treating and activating sea water or polluted water into drinking water according to this invention.

As shown in FIG. 2, sea water or polluted water containing a great amount of deleterious materials such as chlorine, various kinds of heavy metals and environmental hormones, and miscellaneous bacteria is introduced into the given primary treating tank 1. Electrodes are disposed in the primary treating tank 1. Removal of fine particles of oils and removal of various kinds of miscellaneous bacteria are conducted by the effect of the electrodes.

Generally, as the anode for electrolysis, carbon, ferrite, titanium-platinum plated product, titanium-platinum sintered product, etc. are used as the main material. When water is electrolyzed, molecules of water are decomposed into oxygen and hydrogen by electrons at the cathode and fine bubbles referred to as colloidal air are formed in this process. Various kinds of suspended matters, SS, BOD, COD, oils and suspended materials such as N-hexane contained in sea water or polluted water placed in the primary treating tank 1 are deposited with the colloidal air to rise the air-deposited suspended materials or so, and separate into water and SS, in which the suspended materials contained in the sea water or polluted water are separated and removed. However, since the materials used for the electrolysis described above tends to be dissolved easily depending on the current density, liquid temperature and the solute, and endurance life is extremely short, they causes various problems such as in replacement, repair or maintenance when used as the electrodes for facilities and equipments.

In this invention, titanium N-950 is used for the electrode in view of the foregoings.

The titanium alloy, titanium N-950 is used as the anode for electrolysis, highly durable, less soluble and can be used continuously for such a longer period of time without maintenance as existent electrodes are not comparable therewith.

Figure 3:
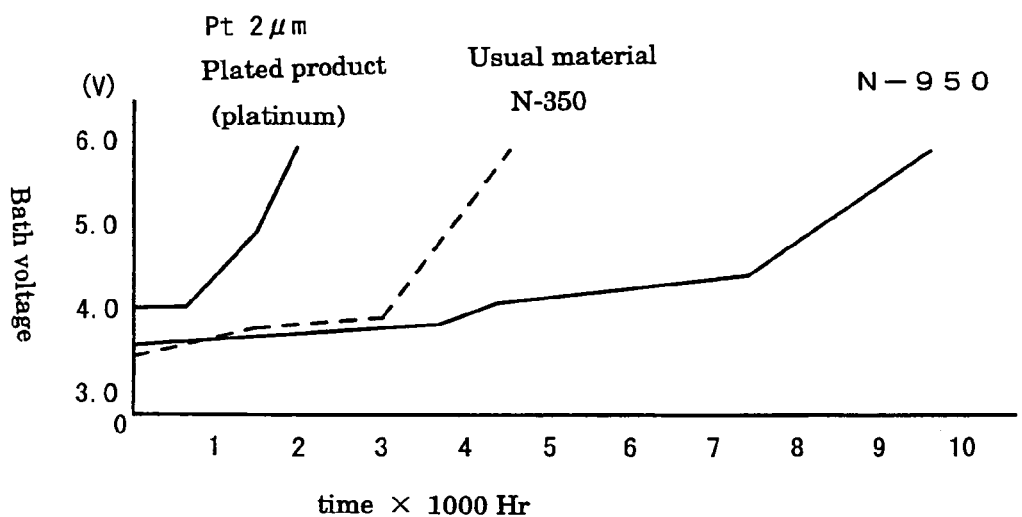
FIG. 3 is a graph showing a comparative example of an electrode.

FIG. 3 shows comparison between titanium-platinum plated product and titanium N-350 as the material used so far and titanium N-950, by continuous operation test.

The insoluble titanium N-950 is disposed in a electrolytic rising device provided in the primary treating tank 1, and separates sea water or polluted water into water and suspended materials. The electrolytic rising device is provided with a rising angle control wing for enhancing the rising efficiency of the suspended materials.

By the device, SS, BOD, COD, oils (also including emulsified oils), N-hexane, nitrogen, phosphorus, dioxin and various kinds of heavy metals can be caused to rise, separated and removed in the primary treating tank 1.

Then, the sea water or polluted water treated in the first treating tank 1 is introduced into a primary filtration tank 2.

A filter media comprising diatomaceous earth and activated carbon are located in the primary filtration tank 2.

In this example, diatomaceous earth and activated carbon are blended at a ratio of 50:50.

Impurities which could not be treated in the primary treating tank 1 can be removed by the primary filtration tank 2 and odors or colorants can also be eliminated.

By the way, in the primary treating tank 1, organic materials or so ionized by the electrode can pass through the primary filtration tank 2 without filtration in the primary filtration tank 2.

Then, water filtered in the primary filtration tank 2 is introduced to the secondary filtration tank 3. In this tank, impurities that could not be filtered completely in the primary filtration tank 2 are filtered.

In the secondary filtration tank 3, sodium chloride or impurity is removed by filtration media such as hollow threads or osmotic membranes.

Also in this process, ionized organic materials or so are not filtered as described above.

Then, water filtered by the secondary filtration tank 3 is introduced into a secondary treating tank 4. Ores are located in the secondary treating tank 4.

As the ores, poryphyritic granodiorite and black porphyry are used in this example. A mixture of the poryphyritic granodiorite and black porphyry which are granulated into a size of about 5–15 mm at 1:1 ratio is used.

The poryphyritic granodiorite is a sort of quartz shist which is "special poryphyritic granodiorite" that was upheaved to the ground surface during crystal movement and suffered from weathering.

The poryphyritic granodiorite contains various kinds of minerals at good balance and high concentration, which is also an excellent far-infrared ray radiator that can emit active multiple-element waves extremely useful to human bodies and can enhance the immunity as well as the cell activity.

In addition, the poryphyritic granodiorite is super porous, has an extremely extensive surface area, comprises anhydrous silicic acid aluminum oxide as a main ingredient, shows intense adsorption effect and ion exchanging effect and can favorably adsorb heavy metals such as mercury, copper, zinc and cadmium.

Further, it shows extremely high adsorption ratio in an adsorption test for *Escherichia coli.* and can reduce such miscellaneous bacteria substantially to zero by circulating use.

Table 1 shows an adsorption state for various kinds of metals by poryphyritic granodiorite.

TABLE 1

| Item for analysis | Raw water | After 7 days | | Removal ratio |
| | | Blank | Sample | |
| --- | --- | --- | --- | --- |
| Mercury | 0.83 | 0.78 | 0.15 | 79.5% |
| Copper | 0.93 | 0.90 | 0.07 | 92.25% |
| Lead | 1.08 | 1.05 | <0.02 | 100.0% |
| Cadmium | 0.93 | 0.92 | 0.34 | 63.0% |
| Methylene blue | 1.3 | 1.3 | <0.1 | 100.0% |
| Hexavalent chromium | 1.03 | 0.99 | 0.75 | 24.2% |
| Fluorine | 1.00 | 1.00 | 0.62 | 38.0% |

(unit: mg/liter)

When the fine powder of the poryphyritic granodiorite is observed under an electron microscopic photograph at 2000×, it can be seen that flakes form a multi-layered structure in which each of the layers is super porous like sponge. It is estimated that the surface area per 1 g amounts to several hundreds square meters, which demonstrates the intensity of the adsorption effect.

On the other hand, the black porphyry is estimated to be fossil of algae formed from diatoms deposited at the sea bottom in the ancient age of several hundred billion years before which were carbonized upon volcanic eruption and upheaved to the ground surface. The black porphyry as the carbonized ores having a nature of prominently emitting inherent active waves for a wide range of waves is far infrared ray radiators. They can absorb a great amount of solar energy and magnetic field energy and, thereby, continuously emit a great amount of resonance waves permanently to provide the cells of living bodies with activity.

It is recognized that the wave length emitted by the black porphyry is a wavelength most similar with the wavelength of an ideal black body in solar light (wavelength band 6–14 $\mu$m, maximum at 8.9 $\mu$m) which is referred to as "growing ray/health ray".

Further, when the far infrared ray radiation rate of black porphyry is measured, it shows a high radiation rate of about 98% in average as a result of measurement at 40° C. or lower (39.8° C.), which is called as a normal temperature.

As described above, minerals contained in the ores of poryphyritic granodiorite and black porphyry located in the secondary treating tank 4 are released, and water is activated by the ores into activated water and, thus, the water is no more petrified.

When poryphyritic granodiorite and/or black porphyry is placed about at the ratio shown in Table 1 into the secondary treating tank 4, a great amount of minerals are released for about 48 hours of the treating time in the secondary treating vessel 4 and the water can be activated.

As has been explained above, minerals can be provided to sea water or polluted water and the water can be modified into activated water by the method of treating the sea water or polluted water into drinking water according to the invention. As a result, deleterious chemical substances and disturbing substances including chlorine, various kinds of heavy metals and environmental hormones, and miscellaneous bacteria contained in sea water or tap water can be composed and eliminated at high accuracy. For example, salts contained in sea water can be removed by about 99.4%. Further, the minerals eluted from multi-element ores can ionize the water to high concentration, to create active water which is easy to be absorbed in living bodies, powerful, refreshing, nice to taste and excellent in the mineral balance.

Further, since water activated by ores such as poryphyritic granodiorite and black porphyry emits radiation rays of a wavelength region extremely similar with the wavelength band emitted from the biological living body, it instantaneously causes electric discharges to molecules of water in the living body. Water is separated by the reaction into hydrogen ions ($H^+$) and hydroxyl ions ($OH^-$) and, since hydrogen ions are eliminated by bonding with electrons ($e^-$) in the molecules of water, this improves the living body to an weak alkaline nature. On the other hand, since hydroxyl ions are bonded with the peripheral molecules of water to form negative ions of strong surface activity referred to as hydroxyl ions. Hydroxyl ions ($H_3O_2^-$) are bonded with molecules of water ($H_2O$) and they are in an extremely instable activated state (radicals) to form a source of powerful energy.

Chemical substances and active oxygen intruding into the living body are eliminated by the effect of the hydroxyl ions to protect cells and DNA as the essential base of the living body. Further, the activated water emits waves in synergistic effect with the far infrared rays to provide the cells with activity thereby outstandingly improving important immunogenic function and metabolic function to provide various excellent effects.

According to the method of treating and activating sea water or polluted water into the drinking water in this invention, since sea water or polluted water is cleaned, as well as minerals are provided to the sea water or treated water to activate the water, the activated water can be utilized generally for drinking water, drinking water stored for emergency use, food processing water for industrial use, water for fish farms and for appreciation fishes.

Further, it can be used as water for growing plants such as greenhouse cultivation, aqueous cultivation and various kinds of gardening cultivation.

Further, it can be utilized as cooking and drinking water such as for cooking rice, digesting foods, pickling vegetables and processing drinking water.

Further it can be utilized as water for home bath rooms, public bath rooms, hot springs, therapeutical bath rooms, health keeping facilities, pools and showers.

Furthermore, it can be utilized also as water for various kinds of diseases such as circulator, supportive tissue and skin diseases such as atopic disease, cardiac infarction, irregular pulse, arterial sclerosis and articular rheumatism; respirator and blood disease such as pneumonia, pulmonum, leukemia, hyperlipemia and hyper tension; digestive and endocrine diseases such as gastric ulcer, diabetes and cirrhosis; cranial nerve diseases such as cerebral edema, cerebral infarction and autonomic nerve disorders.

What is claimed is:

1. A method of treating and activating sea water or polluted water into drinking water characterized by comprising the following steps of:
   1) separating and removing impurities from sea water or polluted water containing a great amount of deleterious materials such as chlorine, various kinds of heavy metals and environmental hormones, and miscellaneous bacteria by an electrode as an anode located in a primary treating tank,
   2) then introducing sea water or polluted water subjected to the primary treatment into a filtration tank, and
   3) further introducing filtered water into a secondary treating tank, releasing useful minerals by magnetic ores located in the secondary treating tank and providing active power to various kinds of not filtered useful organic materials in the treated water.

2. A method of treating and activating sea water or polluted water into drinking water as defined in claim 1, characterized by an electrode using a titanium alloy.

3. A method of treating and activating sea water or polluted water into drinking water as defined in claim 1, characterized by magnetic ores comprising poryphyritic granodiorite and/or black porphyry.

4. A method of treating and activating sea water or polluted water into drinking water as defined in claim 2, characterized by magnetic ores comprising poryphyritic granodiorite and/or black porphyry.

* * * * *